United States Patent [19]

Bary

[11] 4,398,387
[45] Aug. 16, 1983

[54] CHAIN TRAVEL STOP

[75] Inventor: James F. Bary, Snyder, N.Y.

[73] Assignee: Columbus McKinnon Corporation, Amherst, N.Y.

[21] Appl. No.: 356,029

[22] Filed: Mar. 8, 1982

[51] Int. Cl.³ .............................................. F16G 15/00
[52] U.S. Cl. ...................................... 59/93; 254/371; 294/82 R
[58] Field of Search ...................... 59/93, 78, 85, 86; 254/371, 391, 269; 24/230.5 R; 114/200; 294/78 R, 82 R

[56] References Cited

U.S. PATENT DOCUMENTS

| | | | |
|---|---|---|---|
| 1,782,679 | 11/1930 | Chappelka | 254/391 |
| 2,231,416 | 2/1941 | Stahl | 59/95 |
| 2,637,525 | 5/1953 | Lock | 254/269 |
| 3,318,575 | 5/1967 | Hawkins | 294/82 R |
| 3,810,359 | 5/1974 | Schreyer | 254/391 |
| 3,967,572 | 7/1976 | Lea | 114/200 |

FOREIGN PATENT DOCUMENTS 724843  3/1980  U.S.S.R. .................................. 59/93

*Primary Examiner*—Gene Crosby
*Attorney, Agent, or Firm*—Bean, Kauffman & Bean

[57] ABSTRACT

There is disclosed in a chain hoist system or the like, an improved chain travel stop device which is readily attachable to and positionally adjustable on either the load carrying chain or the "slack chain" depending from the load hoisting or pulling machine. The device is positionable with improved facility at any preferred location along the length of any such chains, so as to limit the chain travel relative to the hoist/puller machine.

7 Claims, 15 Drawing Figures

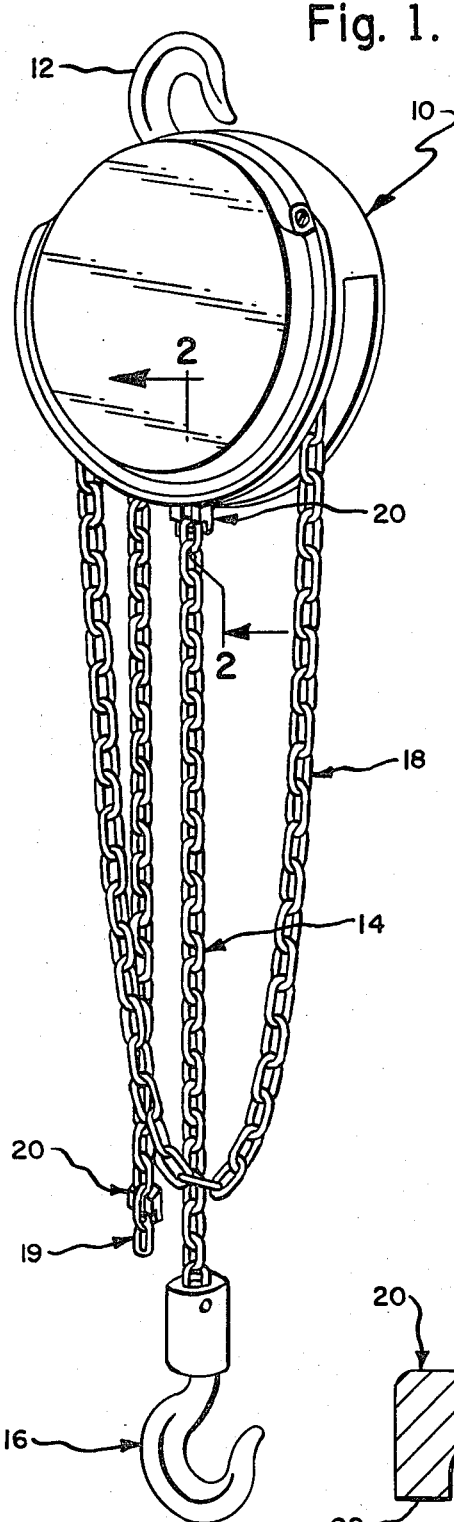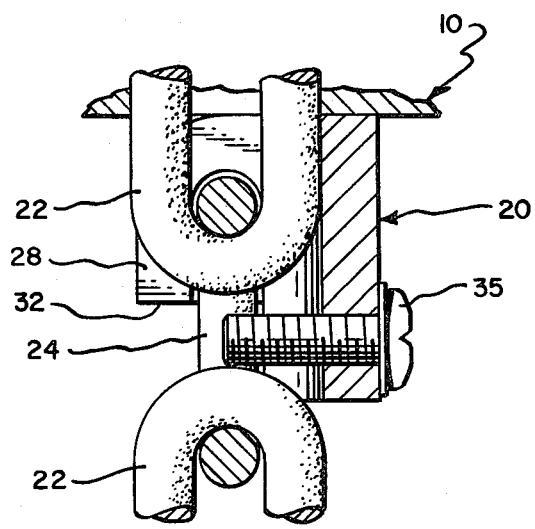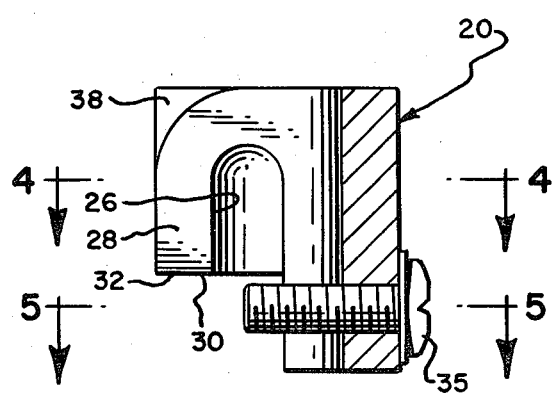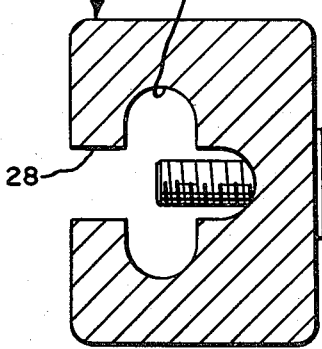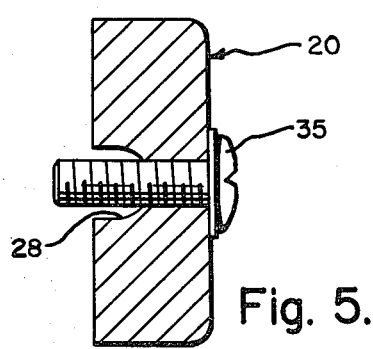

CHAIN TRAVEL STOP

BACKGROUND AND SUMMARY OF THE INVENTION

This invention relates to chain travel control devices such as may be employed in association with either or both the load carrying chain and/or the "slack chain" component of a chain hoist system. The invention may be employed in association with hand-operated or electrically or pneumatically operated chain hoist systems or "pullers"; such as for brevity will be hereinafter referred to simply as "hoists". Devices relevant to this invention known to applicant are disclosed in co-assigned U.S. Pat. Nos. 2,231,416; 3,318,575 and 3,810,359, but note that these devices are fixable only upon the bottom link of a chain and are not adapted to be affixed to any other link of the chain.

The device of the invention comprises a structurally compact, economically manufactured, rigid block-shaped member of uniquely configured form. It is so shaped as to be readily attachable when rotationally oriented about a vertical axis in one direction relative to any one of "every other" of the links in a vertically hanging strand of chain which may be oriented to face in the same direction, so as to provide for "two links at a time" positional adjustments thereon. However, upon 90° rotation of the device about its axis, it is equally readily attachable to chain links of the strand which are intermediate of similarly oriented links, so as to provide for "one link at a time" location adjustments of the device along the chain length.

BRIEF DESCRIPTION OF THE DRAWINGS

FIG. 1 is a perspective view of a hoist of the hand-chain operated type; showing typical locationings of devices of the invention on the load carrying chain as well as on the "slack chain" depending from the hoist;

FIG. 2 is a fragmentary enlarged scale sectional view, taken along line 2—2 of FIG. 1;

FIG. 3 is a view corresponding to FIG. 2, wherein the chain load carrying links thereof are eliminated from the illustration;

FIGS. 4 and 5 are sectional views taken respectively along lines 4—4 and 5—5 of FIG. 3;

DETAILED SPECIFICATION

By way of example at FIG. 1, devices of the present invention are shown as being applied to a hand-chain operated hoist designated generally at 10; although it is to be understood that the device is similarly useful in connection with any other type of hoist or puller, or the like. Such hoists are typically hung from an overhead or lateral support by means of a suspension hook such as is shown at 12. The load carrying chain is shown at 14 and carries a load grappling hook 16. In this case, the chain for manual operation in raising or lowering the load is designated as 18, and the slack chain component running over the hoist lift wheel when a load is being pulled or raised or lowered is shown at 19.

Figure 6:
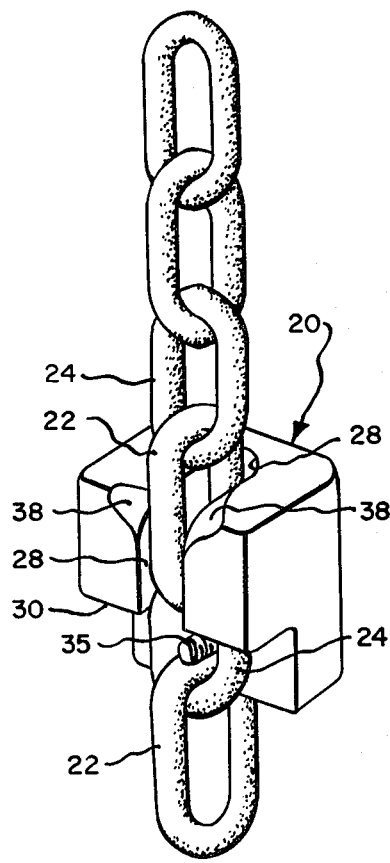
FIG. 6 shows in perspective a device of the invention as being attached to a hoist chain.
Figure 7:
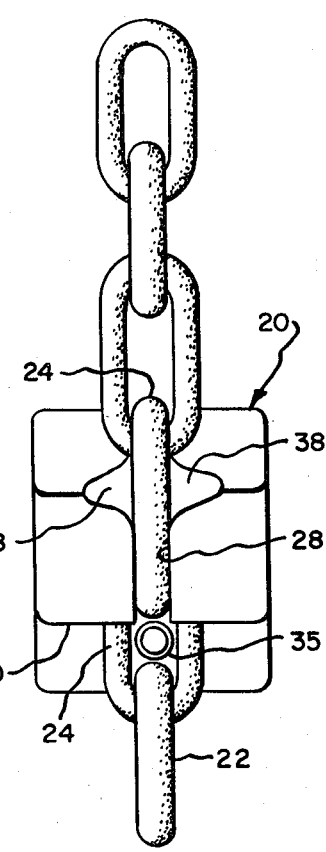
FIG. 7 corresponds to FIG. 6 but illustrates the device in a top frontal perspective view.
Figure 8:
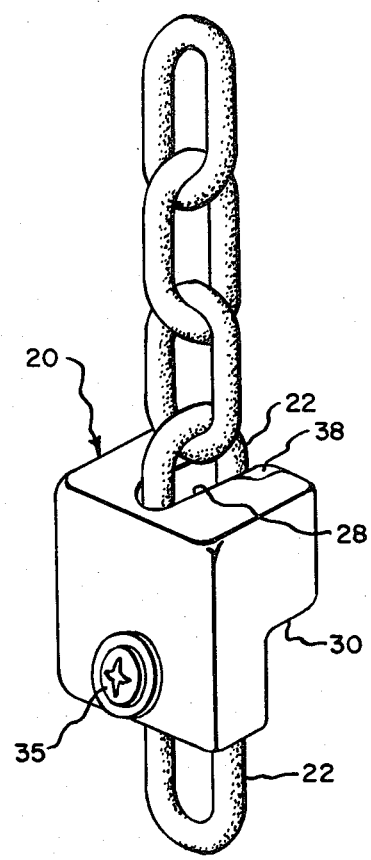
FIG. 8 illustrates the device as in FIGS. 6 and 7, but by way of a back perspective view thereof.

A preferred form of the device of the invention is better illustrated by FIGS. 2-11 of the drawing herewith. Each such device comprises a generally block-shaped body member, designated by the numeral 20, and which is readily mountable upon any desired position along the lengths of the load chain 14 and/or the slack chain 19 thereof, so as to limit the travel thereof in either direction relative to the hoist body and/or to a floor or work bench surface or the like which may be relevant to operation of the hoist. FIGS. 6–8 illustrate the device as being mounted upon one of such referred to strands of chain links; the individual links thereof being designated by the numerals 22,24 according to their 90° transverse alternately relative orientations.

As best shown at FIGS. 3–6 and 8, the generally cubically shaped block 20 of the invention (which may be formed of steel or any other suitable material) is vertically channeled as shown at 26 so as to accommodate when laterally impressed thereon in vertically standing attitude therein a chain link such as is designated at 24 in the drawings herewith. The block 20 is also transversely cut into as shown at 28, from one side wall portion thereof at the uppermost portion of the block, in order to accommodate therein the thereby disposed next adjacent chain link 22. Furthermore, note that the lower portion of the block 20 is rectangularly cut away or "stepped" as is shown at 30, below the position of the chain link 22 when it is captured within the block, and as is shown under the overhanging shoulder portions 32—32.

In FIGS. 2-11, a machine screw and lock washer combination as indicated at 35 is employed as being threaded through the opposite side walls of the block 20 so as to project into the channel 26 just below the "ceiling" of the cutout 30, and to such distance thereinto as to interfere with any unintended slippages of the block 20 upwardly on the thereby captured chain strand. It is of particular note that as shown at FIG. 2, whenever the chain is carrying the mounted block 20 upwardly toward the hoist, any collision of the block with the hoist structure will be taken by the flat top surface of the block; and furthermore, if the link 24 attempts to rise out of the block 20 it butts against the upper end of the channel portion 26 of the block. Thus, the fastener 35 receives no buffeting damage during the process, but simply operates to loosely maintain the block in its designated position on the chain while the block 20 bumps squarely against the bottom of the hoist with no damaging effects upon the chain guide entrance portion thereof. Prior art "chain stop" devices for similar purposes have been found to be propense towards mutilation of the chain guide entrances to such hoists.

Figure 9:
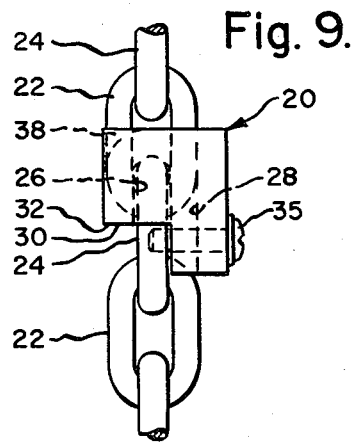
FIG. 9 is a side elevational view showing the stop block in mounted position on the chain.
Figure 10:
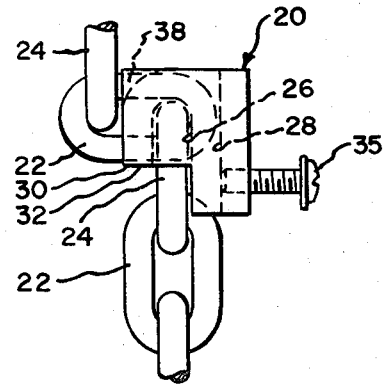
FIGS. 10 and 11 correspond to FIG. 9 but show the progressive steps for detachment of the device of the invention from the hoist chain.
Figure 11:
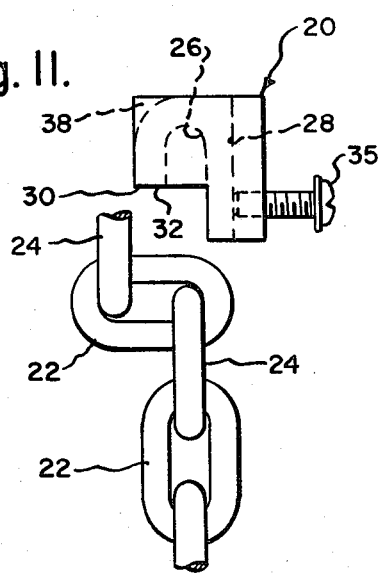
Figure 14:
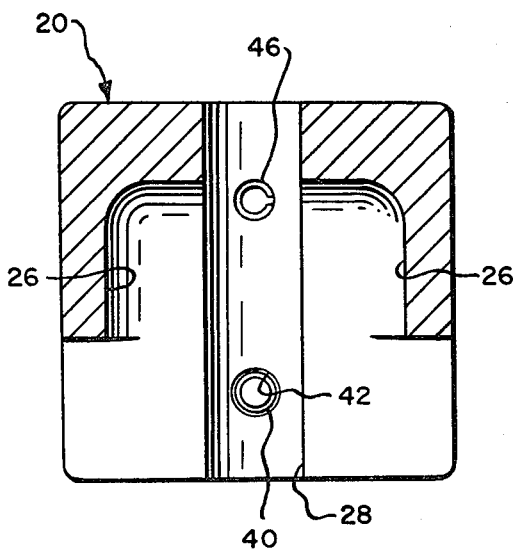
FIG. 14 is a sectional view taken along line 14—14 of FIG. 12.
Figure 12:
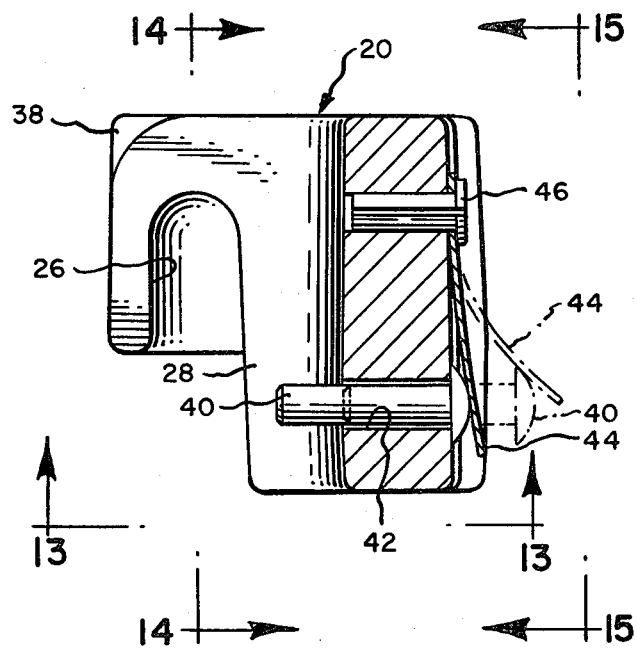
FIG. 12 corresponds to FIG. 3 but illustrates a modified form of construction of the device.
Figure 15:
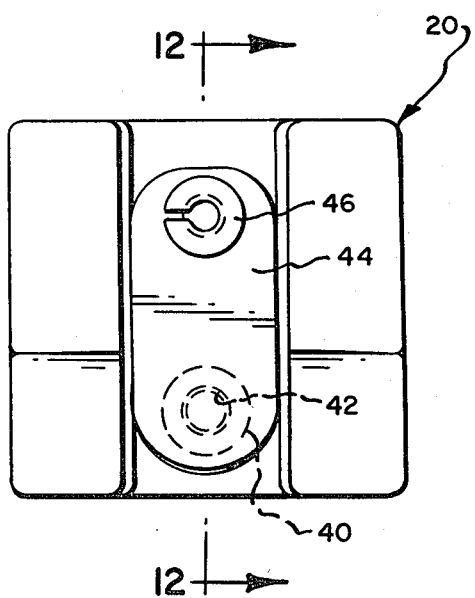
FIG. 15 is a rear side elevational view taken as along line 15—15 of FIG. 12.
Figure 13:
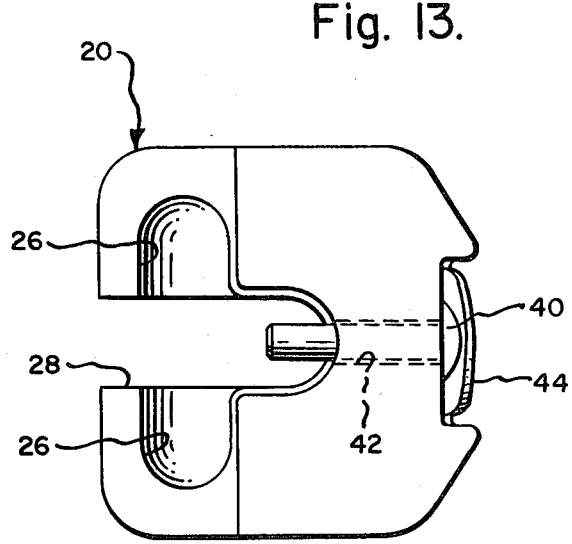
FIG. 13 is a bottom plan view taken along line 13—13 of FIG. 12.

As illustrated at 38—38 (FIGS. 6–8) the upper front inside corner portions of the shoulders 32—32 of the block 20 are concave-beveled or "chamfered" to provide a ramp over which the next above chain link 24 slides whenever it is desired to remove the block from its engagement with the lower chain link 24. Note, however, that the link 24 may not be released from the block until the fastener 35 is retracted from the position thereof as is shown in FIG. 9 of the drawing into the position thereof as is shown in FIG. 10. The chain link 22 may then be readily rotated manually in a sidewise direction as shown at FIG. 10, out of the way of the block 20 whereupon the block may be raised relative to chain link 24. Thus, as is shown at FIG. 11 this permits the link to slide from under the shoulders 32—32 of the block and out through the channel 28.

It is also a particular feature of the invention that the stop block 20 of the invention may (in the orientation thereof relative to the chain strand as is shown at FIGS. 2-11) be vertically shifted and remounted upon every other link 24 of the chain (by skipping the in-between link) for "two links at a time" positional adjustments thereon. Or, alternatively, "one link at a time" positional adjustments on the chain may be attained by simply rotating the stop block device 90° about its vertical axis upon removal of it from any one link of the chain as described hereinabove, and then reapplying it to either the next above or next beloe link of the chain.

FIGS. 12-15 illustrate another form of the invention wherein the block member 20 is substantially identical in configuration to that of the body member shape of FIGS. 2-11. This modification relates to the nature of the device which is employed to maintain the block 20 in operative association with the chain link which is encompassed therein by the block when the block is attached thereon. In lieu of a machine screw 35 as shown in FIGS. 2-11, the fastener 40 may be either of the roll-pin or solid pin type which in either case is adapted to slide-fit into the aperture 42 which is provided in the block to receive the pin 40.

A leaf spring or the like as shown at 44 is mounted on the back side of the block 20 such as by means of a roll-pin or machine screw or by welding or the like as shown at 46 so as to permanently affix the cantilever mounted end of the leaf spring 44 relative to the block 20. Thus, it will be apparent that in this case the block 20 may be conveniently attached to and/or positionally shifted on the hoist chain and/or removed therefrom by manual pressures against the spring and inner end of the slide pin 40 so as to depress the pin so as to enable the block to be mounted and/or dismounted relative to any desired position on the chain. However, it will be understood that under repetitive and severe chain buffeting operational conditions, employment of a screw fastener or the like as shown in FIGS. 2-11 for maintaining a once-established suitable position on the chain may be preferred.

Whereas in the drawing herewith the stop blocks of the invention are illustrated as being generally of cubical form such as may be machined out of square sectioned bar stock, it is to be understood that they may for example be fabricated out of round or other sectionally shaped bar stock. Alternatively, they may be of cast metal form.

I claim:

1. For use in a chain hoist system or the like including hoisting means and a chain strand depending therefrom, a chain strand stop device adapted to be detachably mounted upon any selected one of the interconnecting links of said chain strand for limiting the travel of said chain strand relative to said hoisting means; said device comprising a block formed of rigid metal and having a first slot extending throughout its height and entering said block from one side thereof and terminating short of the opposite side thereof;

the lower portion of said block at said first slot entry side of said block being cut away to the depth of said first slot so as to provide at the upper portion of said block a pair of shoulder portions straddling said first slot and overhanging the bottom cut-away portion of said block;

a pair of second slots formed in said shoulder portions disposed transversely of said first slot and extending from the bottom surfaces of said shoulders vertically therefrom into said block but terminating short of the top surface of said block as well as of the opposed wall portions of said block, whereby said second slots are adapted to accommodate therein the chain next below a chain link accommodated in said first slot and the ceiling portions of said second slots overhang and capture therewithin said next below chain link;

and fastener means manually controllable so as to extend through a side wall portion of said block into the cut-away portion of said block beneath the shoulders thereof for retaining a chain link of said strand when disposed within said second slots in order to operationally maintain said block in mounted relation upon said chain strand; said fastener means being also retractable to permit disengagement of said block from said chain strand.

2. A chain travel stop block as set forth in claim 1 wherein said block is of flat top surface form so as to collide flatwise against said hoisting means whenever called upon to stop the travel of said chain strand relative thereto.

3. A chain travel stop block as set forth in claim 1 wherein said second slots are shaped to complement the upper portion of a chain link when disposed therein and are sized so as to accommodate said chain link in loosely fitted relation therein.

4. A chain travel stop block as set forth in claim 3 wherein the top corner portions of said shoulder portions of said block at opposite sides of said first slot are chamfered.

5. A chain travel stop block as set forth in claim 3 wherein said fastener means is of the machine screw type.

6. A chain travel stop block as set forth in claim 3 wherein said fastener means is of the spring-biased slide pin type.

7. In combination with a travelling chain of the interconnecting chain link type, a chain travel stoppage device manually mountable and positionally adjustable along the length of said chain, said device comprising:

a block formed of rigid metal and having a first slot extending throughout its height and entering said block from one side thereof and terminating short of the opposite side thereof;

the lower portion of said block at said first slot entry side of said block being cut away to the depth of said first slot so as to provide at the upper portion of said block a pair of shoulder portions straddling said first slot and overhanging the bottom cut-away portion of said block;

a pair of second slots formed in said shoulder portions disposed transversely of said first slot and extending from the bottom surfaces of said shoulders vertically therefrom into said block but terminating short of the top surface of said block as well as of the opposed wall portions of said block, whereby said second slots are adapted to accommodate therein the chain next below a chain link accommodated in said first slot and the ceiling portions of said second slots overhang and capture therewithin said next below chain link; and fastener means manually controllable so as to extend through a side wall portion of said block into the cut-away portion of said block beneath the shoulders thereof for retaining a chain link of said strand when disposed within said second slots in order to operationally maintain said block in mounted relation upon said chain strand; said fastener means being also retractable to permit disengagement of said block from said chain strand.

* * * * *